J. H. & W. MORRIS.
Animal-Trap.
No. 203,361. Patented May 7, 1878.
Fig. 1.
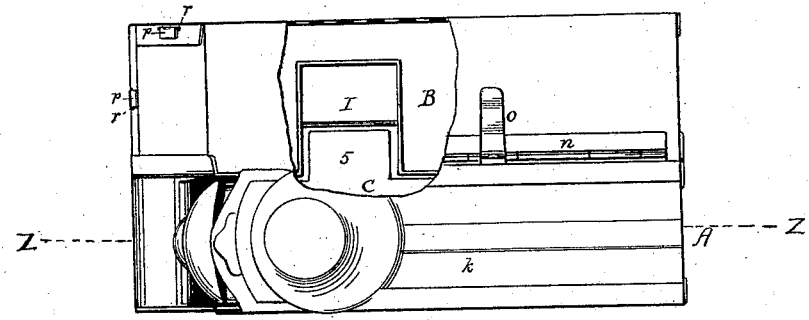
Fig. 2.
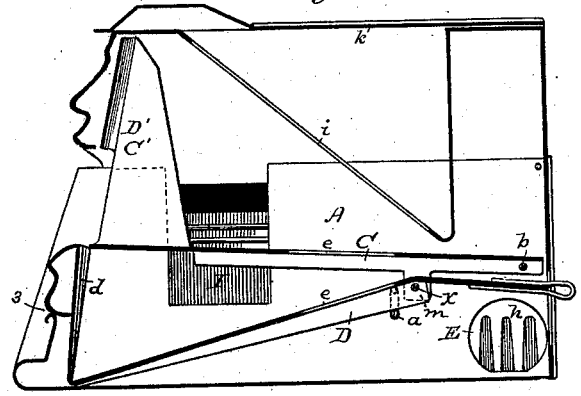
Fig. 3.
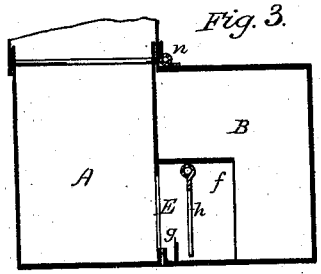
Fig. 4.
WITNESSES:
C. Clarence Poole
Bartram Gevely
INVENTORS
John H. Morris
William Morris
per atty. A. H. Evans & Co.

UNITED STATES PATENT OFFICE.

JOHN H. MORRIS AND WILLIAM MORRIS, OF SEWARD, NEBRASKA.

IMPROVEMENT IN ANIMAL-TRAPS.

Specification forming part of Letters Patent No. 203,361, dated May 7, 1878; application filed March 18, 1878.

*To all whom it may concern:*

Be it known that we, JOHN H. MORRIS and WILLIAM MORRIS, of Seward, in the county of Seward and State of Nebraska, have invented a new and Improved Animal-Trap; and we hereby declare the following to be a full, clear, and exact description thereof, reference being had to the accompanying drawings, making part of this specification, in which—

Figure 1 is a top view of my improved trap, with a portion cut away to show the interior. Fig. 2 is a vertical longitudinal section of the same on line $z\ z$ of Fig. 1. Figs. 3 and 4 are details, to be referred to.

The object of our invention is to furnish an improved trap for catching animals and other similar uses, which shall remain open except when an animal may attempt to go out, and which will again open when he desists from his attempt.

The invention consists in the combination of duplex hinged gates, automatically operating by a weight thrown upon one of them, in combination with certain other elements, as hereinafter more fully described.

In order that those skilled in the art may make and use our invention, we will proceed to describe the manner in which we have carried it out.

In the said drawings, A is a compartment, closed at one end and open at the other, and having openings communicating with another compartment, B, lying alongside. In compartment A, at $a$, is a wire stirrup, which forms a fulcrum, on which turns the tilting-jaw D, shaped as shown in Fig. 2.

Jaw D is operated by the lever-jaw C, pivoted at $b$ on its fulcrum, and applying its power to the jaw D at $x$. The jaws are pivoted together loosely at a point, $x$, in the rear of stirrup $a$, and a projection from jaw D passes through the rear of the compartment, and the rear end of jaw C is pivoted in the casing at $b$. The normal condition of the trap, owing to the manner of pivoting, is kept by gravity with the jaws, as seen in Fig. 2. The end $d$ of the jaw D is turned and forms the lower lip, while piece C' forms the upper lip.

When an animal passes between the lips into the jaws, and his weight is thrown on jaw C, it instantly moves on pivot $b$, and, descending, brings down part C', which partially closes the opening. At the same moment jaw D is acted on by the movement of jaw C, and, with stirrup $a$, (center of motion,) the turned-up portion $d$ moves upward, so as to completely close the entrance. This operation entraps the animal, for as long as his weight remains on jaw C the opening or mouth will continue closed. Suitable holes $e\ e$ in the two platforms form an outlet toward a gate, E, leading into compartment B. When the platform is relieved of the weight of the animal, gravity, acting on plate D, carries it down, and it, acting on plate C through means of the stirrup $a$ as a fulcrum, throws the forward end of C upward, leaving the trap set for another victim.

The opening into compartment B has a housing, $f$, and a sill, $g$. Across the housing is a swinging gate, $h$, which will open into compartment C by means of sill $g$, against which it strikes. This door stands almost vertical, so that it is easily moved inwardly. The housing $f$ prevents the animal from getting into any position where it can pull the door open.

From the front of the box to the rear, and running from the top to the bottom diagonally, is a grated or netted diaphragm, $i$, to hold the bait, which is introduced through a movable top, $k$. In addition to this main bait-box I provide a supplemental one at I, set into the wall of the trapping-chamber, near the mouth or opening through which the animal enters the trap, in order to have its effect upon the most wary or timid animals. A projection of jaw C (marked 5) passes through the opening in the trapping-chamber into the bait-box I.

Owing to the peculiar system of leverage, and the fact that the lip $d$ rests on the front of the casing of the trap at 3, it forms an immovable approach to the trap, and there is no danger of any of the parts moving prematurely to frighten the animal.

Compartment B is hinged to compartment A longitudinally at $n$, and both compartments have one side in common. A latch or other suitable means, $o$, keeps the compartments close alongside of each other.

We prefer and intend to put these traps together so as to avoid soldering. This is accomplished by means of tongues $p$ and openings $r$ at suitable places.

The upper jaw C is provided on each side with ears $m$ $m$, which clasp over the edge of jaw D, and the pivot $x$ passes through them all; and the lower edges of the ears are turned up, so that the ends of the rivet abut against the turned-up portions, and it is thereby retained in place.

Having thus described our invention, what we claim as new, and desire to secure by Letters Patent, is—

1. The jaw C, pivoted to the casing, in combination with jaw D, having its rear end pivoted to C, and stirrup $a$, substantially as and for the purpose described.

2. In an animal-trap, the jaws D C, in combination with stirrup or swinging pivot $a$, substantially as set forth.

3. The lower jaw D, provided with the turned-up portion or lip $d$, in combination with the casing and jaw C, as and for the purpose described.

JOHN H. MORRIS.
WILLIAM MORRIS.

In presence of—
O. J. B. WILLIAMS,
THOS. MORRIS.